United States Patent

[11] 3,586,943

| [72] | Inventor | Raymond Joseph Gonzalez<br>Rockaway, N.J. |
|---|---|---|
| [21] | Appl. No. | 760,450 |
| [22] | Filed | Sept. 18, 1968 |
| [45] | Patented | June 22, 1971 |
| [73] | Assignee | Union Carbide Corporation<br>New York, N.Y. |

[54] TORCH OSCILLATING SYSTEM
8 Claims, 2 Drawing Figs.

[52] U.S. Cl. .................................................. 318/257,
318/266, 318/282, 318/297, 318/300
[51] Int. Cl. .................................................. H02p 5/00
[50] Field of Search ........................................ 318/257,
266, 282, 286, 297, 300, 20.860

[56] References Cited
UNITED STATES PATENTS

| 2,648,038 | 8/1953 | Morse et al. | 318/282 |
| 2,826,726 | 3/1958 | Mitchell | 318/281 |
| 3,230,341 | 1/1966 | Blackburn | 318/281 |
| 3,418,547 | 12/1968 | Dudler | 318/448 |
| 3,474,573 | 10/1969 | Homeyer | 318/282 |

*Primary Examiner*—Benjamin Dobeck
*Assistant Examiner*—K. L. Crosson
*Attorneys*—Thomas I. O'Brien, Paul A. Rose, Dominic J. Terminello and Eugene Lieberstein

ABSTRACT: A solid-state torch oscillating system for controllably reciprocating the torch about an adjustable reference position in a direction transverse to the direction of welding. The system includes a bridge network which provides a differential pulse output signal, the polarity of which is synchronized to the motor rotation for controlling the direction of a continuous sequence of drive pulses being applied to the motor and means responsive to the distance traversed by the torch for reversing the polarity of the bridge output signal.

3,586,943
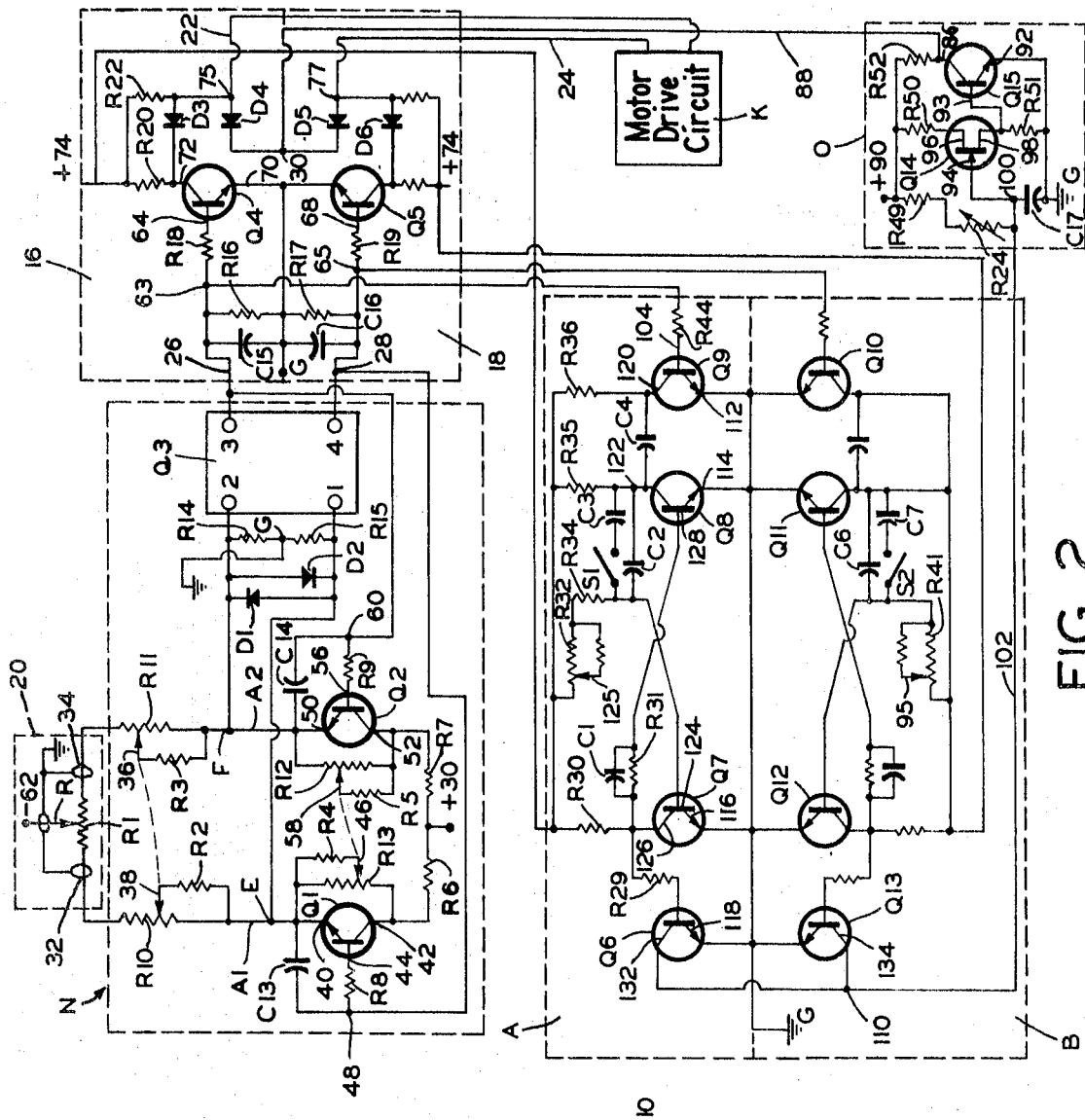
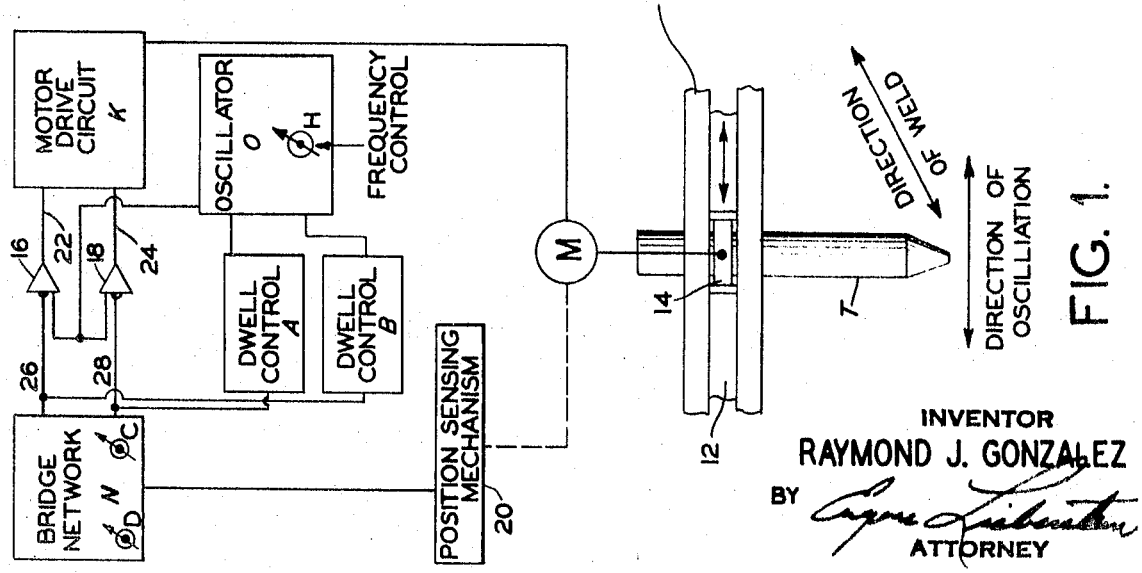
FIG. 2.
FIG. 1.
INVENTOR
RAYMOND J. GONZALEZ
BY
ATTORNEY

TORCH OSCILLATING SYSTEM

This invention relates to welding torch oscillations and more particularly to an electromechanical torch oscillating system which may be selectively adjusted to meet different welding requirements.

In circumferential welding such as pipe welding as well as in weld surfacing, it is desirable to oscillate the torch head in a direction transverse to the line of welding. For such welding operations the torch as it is being moved forward is required to sweep back and forth across the groove at a controlled rate determined by the particular welding conditions. In addition, the torch after each swing prior to reversing its direction must dwell or remain stationary for a predetermined period of time.

Heretofore, oscillation of the torch head was accomplished by a mechanical oscillating unit which included a set of cam followers for introducing dwell at each end of oscillation. The frequency of oscillation and dwell periods were necessarily fixed. For each new set of welding conditions the mechanical oscillating unit was replaced by another designed for that particular set of conditions. Moreover, prior arc mechanical torch oscillators were generally cumbersome and unwieldy, could not function satisfactorily at high oscillating speeds especially under narrow width operating conditions and were limited to relatively light loads.

It is therefore the primary object of this invention to provide an oscillating unit which is selectively adjustable to meet different operating conditions.

It is a further object of this invention to provide an oscillating unit which may be remotely controlled.

It is yet another object of this invention to provide an oscillating unit which can carry relatively heavy loads.

It is an even further object of this invention to provide an electromechanical oscillating unit which may be remotely controlled and which has incorporated therein means for selectively adjusting the oscillating frequency; means for adjusting the oscillating amplitude (width of stroke), and means for selectively controlling dwell at the end of each stroke.

It is another object of this invention to provide a remote control electromechanical torch oscillating unit which has a substantially instantaneous response and which can produce relatively high frequency narrow width oscillations with a controlled dwell at the end of each stroke.

In the drawings:

FIG. 1 is a block diagram illustrating the invention;

FIG. 2 is a detailed circuit diagram of the oscillating system of FIG. 1.

DETAILED DESCRIPTION OF THE INVENTION

Referring now to FIG. 1, TORCH T is connected to coupling unit 14, which in turn is slidably mounted in boxlike casing 10 for longitudinal reciprocation along slide rail 12. Motor M is drivingly engaged to coupling unit 14 through a gear assembly (not shown) for controllably reciprocating the torch in the longitudinal direction shown by the arrows. The torch is additionally driven by means not shown in a direction substantially perpendicular to the direction of oscillation for performing a welding operation.

Motor M is driven alternately in a clockwise and counterclockwise direction by discrete unidirectional pulses applied successively to the field windings of motor M through motor drive circuit K. For purposes of this invention, any conventional type of motor may be selected which may be driven in alternate directions by either a reversal of the polarity of the applied input signal to the motor field windings or by selectively redirecting the applied input signal from a first, or set of first, field windings to a second, or set of second, field windings angularly disposed from the first field windings. It is preferred to select motor M from the class known to the art as stepping motors. A stepping motor is generally of the synchronous type having polyphase bifilar field windings. The shaft of the stepping motor is caused to make a discrete rotational step for every pulse applied to the field windings. The direction of rotation is determined by the set of field windings energized by the applied pulse. Applying a pulse to one predetermined set of field windings will generate a clockwise rotation and to a second predetermined set of field windings a counterclockwise rotation. The number of applied input pulses per unit time, or frequency, will govern the rotational angular velocity of motor M and in turn the speed of travel of torch T. The direction of travel assumed by torch T depends solely upon the direction of rotation of motor M.

The drive pulses applied to the field windings of motor M originate from oscillator O. The drive pulses are sequentially applied to motor drive circuit K through conductor leads 22 and 24. Motor drive circuit K responds to drive pulses supplied from conductor lead 22 to cause clockwise motor rotation and to drive pulses supplied from conductor lead 24 to cause counterclockwise motor rotation. Motor drive circuit K represents conventional amplifying and steering circuitry for amplifying the drive pulses as well as directing them to the appropriate set of motor field windings.

The drive pulses generated by oscillator O are applied concurrently to AND gates 16 and 18. AND gates 16 and 18 act as vales permitting the drive pulses to pass therethrough in one mode of operation and preventing their passage in another mode. The type of AND gate employed herein provides a positive output voltage during the concurrent application of positive input signals. Thus, assuming oscillator O generates positive drive pulses or negative going pulses i.e. always above zero amplitude, then AND gate 16 will conduct when a signal of negative polarity is present upon conductor 26. Likewise, AND gate 18 will conduct i.e. pass the drive pulses from oscillator O when conductor 28 has a negative polarity signal thereon.

Bridge network N applies a continuous differential output signal to conductors 26 and 28 of alternating polarity. Accordingly, for one polarity conductor 26 will be negative and conductor 28 positive, while for the opposite polarity conductor 28 will be negative and conductor 26 positive. As previously stated, when conductor 26 is rendered negative, drive pulses from oscillator O will be passed through AND gate 16 to motor drive circuit K for rotating motor M clockwise. In the same manner when conductor 28 is rendered negative, drive pulses from oscillator O will pass through AND gate 18 to cause counterclockwise motor rotation. Torch T moves in response to the rotation of motor M in either of two longitudinal directions. Hence, the direction of movement of torch T is determined by the instantaneous polarity of the output signal of bridge network N, while the distance traversed in each direction depends upon the time duration of the polarized bridge output signal. Each half cycle of the bridge output signal is of equal duration causing the torch to traverse the same distance in each direction. By varying the period of the output signal of bridge network N the distance traversed by torch T may be varied. An adjustable control C is provided in bridge network N for presetting the torch stroke or excursion.

Position sensing means 20, shown in FIG. 1, supplied a bias signal to bridge network N responsive to the instantaneous position of torch T along slide rail 12. The bias signal synchronizes the output signal of bridge network N to the oscillating excursions of torch T. Accordingly, the reference position about which torch T will oscillate is determined by bridge network N. The manner is which this is accomplished will be explained later in the discussion of the operation of the system. A selectively adjustable control D is provided for presetting the reference position about which torch T will oscillate.

In addition, a pair of dwell controls A and B, shown in FIG. 1, are provided to temporarily halt or suspend movement of torch T upon reaching its outer extremity in either longitudinal direction. Dwell controls A and B are manually adjustable and independent of one another. Thus, movement of the torch may be suspended in one direction for one period of time, and in the opposite direction for a second period of time. The operation of the dwell controls will be discussed in detail later.

A complete circuit diagram of the oscillating system of FIG. 1 is shown in FIG. 2. Bridge network N, shown in FIG. 2 blocked off with dotted lines, consists of a bridge circuit 25 and a linear differential amplifier Q3. Bridge circuit 25 has two symmetrically disposed arms A1 and A2. Arms A1 and A2 are tied together at one end to positive terminal 30 of a conventional DC power supply not shown while the opposite ends are connected respectively to terminals 32 and 34 of position sensing means 20. Arm A1 includes resistor R6, switching transistor Q1 and variable potentiometer R10. Arm A2 includes resistor R7, switching transistor Q2 and variable potentiometer R11. The output of bridge circuit 25 is taken at the midpoints of arms A1 and A2 at points E and F respectively. Variable potentiometer R10 of Arm A1 is selectively adjustable by means of wiper arm 38. Resistor R2 is connected in series with wiper arm 38. Variable poteniometer R11 is selectively adjustable through wiper arm 36 which has a fixed resistor R3 connected in series therewith. Wiper arm 38 of variable potentiometer R10 is mechanically ganged to wiper arm 36 of variable potentiometer R11.

Switching transistor Q1 consists of emitter 40, collector 42, and base 44. Variable potentiometer R13 is connected at one end to emitter 40 and at the other end to collector 42. Variable potentiometer R13 is adjustable by means of wiper arm 46 having fixed resistor R4 in series therewith. Base 44 of switching transistor Q1 is connected through resistor R8 to terminal point 48. Capacitor C13 is connected at one end to emitter 40 and at the other end to terminal point 48.

Switching transistor Q2 consists of an emitter 50, collector 52 and base 56. Variable potentiometer R12 is connected at one end to emitter 50 and at the other end to collector 52. Variable potentiometer R12 is adjustable by means of wiper arm 58 which has a fixed resistor R5 is series therewith. Base 56 of switching transistor Q2 is connected through resistor R9 to terminal point 60. Capacitor C14 is connected at one end to emitter 50 of switching transistor Q2 and at the other end to terminal point 60.

Wiper arm 46 of variable potentiometer R13 is mechanically ganged to wiper arm 58 of variable potentiometer R12 and coupled to manually adjustable control D.

Position sensing means 20 consists of variable feedback potentiometer R1. Wiper arm R of variable feedback potentiometer R1 is connected to the negative terminal 62 of the DC power supply not shown and is, in addition, mechanically coupled to motor M for lineal movement along variable potentiometer R1 in response to the rotation of motor M.

Output points E and F of bridge circuit 25 are connected respectively to input terminals 1 and 2 of linear-differential amplifier Q3. In parallel with input terminals 1 and 2 of differential amplifier Q3 is a pair of diodes D1 and D2 connected in back to back relationship. Also connected in parallel across input terminals 1 and 2 are series connected resistors R14 and R15 center tapped to ground terminal points G.

The output of linear-differential amplifier Q3 is taken at terminal points 3 and 4. Terminal point 3 is connected to conductor 26 which in turn is connected to one end of resistor R18 at junction 63. The other end of resistor R18 is connected to the base 64 of transistor Q4 of AND gate 16 Terminal point 4 is connected to conductor 28 which in turn is connected to one end of resistor R19 at junction 65. The other end of resistor R19 is connected to the base 68 of transistor Q5 of AND gate 18. The parallel combination of resistor R16 and capacitor C15 is connected at one end to junction 63 and at the other end of ground terminal G. The parallel combination of resistor R17 and capacitor C16 is connected at one end to junction 65 and at the other end to ground terminal G.

AND gates 16 and 18 are shown in FIG. 2 blocked off with dotted lines. AND gate 16 is electrically equivalent to AND gate 18. Emitter 70 of transistor Q4 of AND gate 16 is connected to ground terminal G while the collector 72 thereof is connected through resistor R20 to the positive terminal 74 of a DC power supply not shown. In parallel with resistor R20 is the series combination of resistor R22 and diode D3. The cathode end of diode D3 is connected to the collector 72 of transistor Q4 while the anode end is connected to terminal point 75. Terminal 75 represents the output of AND gate 16. The anode end of diode D6 represents the output of AND gate 18.

The anode end of diode D4 is connected to output terminal 75 of AND gate 16, while the anode end of diode D5 is connected to output terminal 77 of AND gate 18. The cathode end of diodes D4 and D5 are tied together at junction 80. Output terminal 75 of AND gate 16 is additionally connected to motor drive circuit K through conductor lead 22 while output terminal 77 of AND gate 18 is connected to motor drive circuit K through conductor lead 24. The circuitry of motor drive circuit K for controlling the rotation of motor M forms no part of the present invention and therefore has not been disclosed.

Oscillator O shown in FIG. 2 blocked off with dotted lines is of the relaxation type providing a continuous output of discreet unidirectional pulses at the collector 86 of transistor Q15 with respect to ground. Collector 86 is connected by means of conductor 88 to junction point 80 between AND gates 16 and 18. Collector 86 is also connected through resistor R52 to the positive terminal 90 of a DC power supply now shown. The emitter 92 of transistor Q15 is connected to ground terminal point G. Unijunction transistor Q14 includes a control electrode 94 and emitters 96 and 98 respectively. Emitter 96 is connected through resistor R50 to the positive terminal 90 of the power supply. Emitter 98 of unijunction transistor Q14 is connected through resistor R51 to ground terminal point G and to the base 93 of transistor Q15. Control electrode 94 of unijunction transistor Q14 is connected to common junction point 100 between capacitor C17 and variable resistor R24. Variable resistor R24 represents the frequency control H of oscillator O, shown in FIG. 1. The other end of variable resistor R24 is connected through resistor R49 to positive power supply terminal 90 while the other end of capacable C17 is connected to ground terminal G.

Dwell controls A and B are shown in FIG. 2 blocked off with dotted lines. Dwell controls A and B are identical single shot multivibrators having a common output terminal 110 which is connected through conductor lead 102 to junction point 100 of oscillator O. Hence, the output of each dwell control shunts capacitor C17 of oscillator O. Dwell control A includes transistors Q6, Q7 and Q8 and Q9. The base 104 of transistor Q9 is connected through resistors R44 to junction point 63 of AND gate 16. Emitters 112, 114, 116 and 118 of transistors Q9, Q8, Q7 and Q6 respectively of dwell control A are connected to common ground G. The collector 120 of transistor Q9 is connected through resistor R36 to the positive power supply terminal 74 and through capacitor C4 to the collector 122 of transistor Q8. The collector 122 of transistor Q8 is connected through resistor R35 to the positive power supply terminal n4 and through capacitor C2 to the base 124 of transistor Q7. Normally open switch S1 is in series with capacitor C3, the combination being connected in parallel with capacitor C2. The base 124 of transistor Q7 is connected through resistor R34 to one end of dwell potentiometer R32. The other end of dwell potentiometer R32 is connected to the positive power supply terminal 74. Dwell potentiometer R32 includes a manually adjustable wiper arm 125. Collector 126 of transistor Q7 is connected through resistor R31 to the base 128 of transistor Q8 and through resistor R30 to the positive power supply terminal 74. A commutating capacitor C1 is connected across resistor R31. Collector 126 of transistor Q7 is also connected through resistor R29 to the base 130 of transistor Q6. Collector 132 of transistor Q6 represents the output of dwell control A and is connected in common with the output 134 of dwell control B at junction point 110 which is connected by means of conductor 102 to junction point 100 in oscillator O. Dwell control B includes transistors Q10, Q11, Q12 and Q13 and a dwell potentiometer R41 which has a manually adjustable wiper arm 95. The circuit components of dwell control B are equivalent to those of dwell control A. Therefore, for the sake of brevity a detailed description of the circuit connections of dwell control B will not be given.

OPERATION OF THE TORCH OSCILLATOR SYSTEM

Referring to both FIGS. 1 and 2, torch T is swept back and forth along slide rail 12 in an oscillatory fashion by the controlled rotation of motor M. Motor M is driven in either a clockwise or counterclockwise direction by a series of discrete unidirectional drive pulses generated by oscillator O. Oscillator O is of the relaxation type in which a timing interval is established by the gradual charging of capacitor C17, shown in FIG. 2, through variable resistor R24, and fixed resistor R49. When the charge built up upon capacitor C17 reaches the firing potential of unijunction transistor Q14, the timing interval terminates and capacitor C17 abruptly discharges through resistor R51. The unijunction transistor Q14 then reverts to its blocking state and the charging cycle repeats itself. A continuous output of narrow width negative going unidirectional pulses is produced at the collector 86 of transistor Q15. The number of pulses produced per unit time or frequency depends upon the rate of charge of capacitor C17 which is manually adjustable by variable resistor R24. Variable resistor R24 represents frequency control H shown in FIG. 1. Hence, adjustment of frequency control H will govern the rotational angular velocity of motor M and as such the speed of travel of torch T.

The drive pulses generated by oscillator O are applied concurrently to AND gates 16 and 18 from common terminal 80 shown in FIG. 2. Additional input signals are applied to AND gates 16 and 18 by Bridge Network N. Bridge network N provides a continuous differential output signal, the polarity of which is selectively controlled in a manner to be explained shortly. The output of Bridge network N at terminals 3 and 4 of linear differential amplifier Q3 is applied through conductors 26 and 28 to switching transistors Q4 and Q5 of AND gates 16 and 18 respectively. For a first interval of time terminal 3 will be positive with respect to terminal 4 and for a second interval of time terminal 4 will be rendered positive with respect to terminal 3, the polarity therebetween being alternated at controlled time intervals. When output terminal 3 of linear differential amplifier Q3 is rendered positive, switching transistor Q4 of AND gate 16 is forced into saturation. Current is drawn through resistor R20 and through the collector 72 to emitter 70 of transistor Q4 to ground terminal G. Current is additionally drawn from the power supply not shown through resistor R22 and diode D3 for effectively clamping junction point 75, the output of AND gate 16, to ground potential. The clamping action at junction 75 prevents drive pulses from passing through diode D4 during the entire first interval of time. Simultaneously, output terminal 4 of amplifier Q3 is at a negative potential maintaining switching transistor Q5 is a nonconducting or cutoff state. With switching transistor Q5 nonconducting diode D5 will pass the drive pulses generated by oscillator O via conductor lead 24 to motor drive circuit K. Motor drive circuit K amplifies and directs the drive pulses to the motor field windings for rotating motor M in a counterclockwise direction. During the second interval of time, the polarity of the output differential signal on terminals 3 and 4 reverses. This causes diode D4 of AND gate 16 to conduct permitting the drive pulses to pass by means of conductor lead 22 to motor drive circuit K. Transistor Q5 switches to a conducting state. Current is drawn through diode D6 which results in clamping junction 77, the output of AND gate 18, to ground potential thus blocking drive pulses from passing through diode D5. The drive pulses passed through diode D4 to motor drive K are amplified and directed to the motor field windings such that motor M is rotated in a clockwise direction.

Position sensing means 20 of FIG. 1 is shown in FIG. 2 consisting of variable feedback potentiometer R1. Wiper arm R of variable potentiometer R1 is alternately driven from one end of potentiometer R1 to the opposite end and back in response to the rotation of motor M. The position of wiper arm R along potentiometer R1 determines the amount of bias supplied to arms A1 and A2 of bridge circuit 25. Let us assume for purposes of illustration that ganged wiper arms 36 and 38 of potentiometers R10 and R11 respectively are manually adjusted through control C of FIG. 1 to provide equal resistance in each of arms A1 and A2 and that ganged wiper arms 46 and 58 of potentiometers R13 and R12 respectively are adjusted through control D to provide maximum resistance across each transistor Q1 and Q2. Let us also assume that wiper arm R is being driven from end 34 to end 32 of variable potentiometer R1. Under these conditions transistor Q1 is in the saturation region i.e. conducting heavily while transistor Q2 is at cutoff i.e. nonconducting. Accordingly, output point E of Arm A1 will be at a maximum positive potential while output point F of arm A2 will be at a negative potential as determined by the resistive combination of R7, potentiometer R12 in parallel with R5 and potentiometer R11 in parallel with R3. As wiper arm R approaches end 32 of potentiometer R1, the potential at output points E and F approach zero respectively. This in turn causes the output of linear differential amplifier Q3 to fall rapidly toward zero. The output of linear differential amplifier 23 at terminals 3 and 4 is fed back as an input signal to transistors Q2 and Q1, respectively. The substantially zero voltage generated in the output of differential amplifier Q3 causes the transistors Q1 and Q2 to reverse state. The reversal in state between transistors Q1 and Q2 is attributable to regenerative action since the loop gain of bridge network N is designed to be greater than one. Thus, transistor Q1 is driven from the conducting to the nonconducting state while transistor Q2 is driven from the nonconducting to a conducting state. The reversal in state between transistors Q1 and Q2 occurs almost instantaneously. With transistors Q1 nonconducting, output point E of arm A1 drops to a negative potential determined by the resistive combination of R6, potentiometer R13 in parallel with R4 and potentiometer R10 in parallel with R2, whereas output point F of arm A2 rises to a positive potential due to the conduction of transistor Q2. Thus, a reversal in the operating mode between transistors Q1 and Q2 is accompanied by both a reversal in polarity in the output of bridge circuit 25 at points E and F and a reversal in the polarity of the output of bridge network N at terminals 3 and 4 of linear differential amplifier Q3. The direction of rotation of motor M is dependent upon the output polarity of Bridge network N as explained hereinbefore. Accordingly, a reversal in output polarity reverses the direction of rotation of motor M which in turn reverses the direction of movement of both torch T and wiper arm R. As wiper arm R approaches the opposite end 34 of potentiometer R1 output points E and F of arms A1 and A2 would again approach zero causing another reversal in the operating mode between transistors Q1 and Q2 resulting again in a reversal in the direction of rotation for motor M and an accompanying reversal in direction for both torch T and wiper arm R. These events continuously repeat themselves causing wiper arm R to continuously alternate between end 34 and end 32 of variable potentiometer R1. This assumes that control D is adjusted for maximum torch oscillation i.e. swing, control D can be manually adjusted for any predetermined torch swing.

The reversal in wiper arm direction occurs when the output of bridge circuit 25 is at approximately zero potential i.e. when output points E and F of arms A1 and A2 are approximately zero. A zero output actually represents a balance or null condition for bridge circuit 25. However, since the output of linear differential amplifier Q3 is fed back as an input to transistors Q1 and Q2 respectively, the balance condition of bridge circuit 25 also represents a condition of unstable equilibrium. By regenerative action the transistors Q1 and Q2 are forced to reverse their states. The regenerative action is speeded up by capacitors C13 and C14.

Potentiometers R10 and R11 are simultaneously controlled by control C of FIG. 1 such that with wiper arm 38 fully extended or in its uppermost position wiper arm 36 will be at the opposite extreme or lowermost portion. With control knob C adjusted to a center position wiper arms 36 and 38 will be at the midpoints of potentiometers R10 and R11 respectively. At this control setting arms A1 and A2 of bridge circuit 25 are symmetrical. Wiper arm R will therefore oscillate about the center of potentiometer R1. The control setting may be adjusted either to the left or right of its center position to bias bridge circuit 25 to one side or the other. An adjustment of control C to the left of center biases more heavily arm A1. The effect of this is to shift the position about which wiper arm R reciprocates. Since torch T oscillates in response to the reciprocating action of wiper arm R the reference position about which torch T will oscillate is determined by the setting of control knob C. In practice, torch T would be adjusted manually to the center of slide rail 12 with control knob C placed in its center position. Thus, the center position of control knob C would represent the center of slide rail 12.

Bridge circuit 25 generates a differential output signal which continuously varies in magnitude as wiper arm R traverses potentiometer R1. A substantially constant magnitude input signal of alternating polarity is supplied to linear differential amplifier Q3 as a result of the limiting or clipping action provided by diodes D1 and D2 in combination with resistors R14 and R15. Differential amplifier Q3 generates a substantially square wave output at terminals 3 and 4. The circuitry of linear differential amplifier Q3 is of conventional design forming no part of the present invention. When terminal 3 is negative, terminal 4 is positive and vice versa, the crossover occuring during the transition in state between transistors Q1 and Q2 of bridge circuit 25. The output signals at terminals 3 and 4 with respect to ground are passed through low pass filter capacitors C15 and C16 respectively. Capacitors C15 and C16 serve to suppress noise. The output signals are thereafter applied concurrently to AND gates 16 and 18 additionally to dwell controls A and B.

Dwell control A receives the substantially square wave signal generated at output terminal 3 while dwell control B receives the opposite polarity substantially square wave signal generated at output terminal 4 each with respect to ground G. As stated earlier, each negative half cycle controls the direction of motor rotation. The crossover from negative to positive potential at terminal 3 and from positive to negative potential at terminal 4 marks the end of motor rotation in a clockwise direction and the beginning of motor rotation in a counterclockwise direction. In addition, the crossover from negative to positive potential at terminal 3 activates Dwell control A. The sharp rise in potential turns transistor Q9 from a nonconducting to a conducting state causing the potential at collector 120 to drop sharply. The voltage drop at collector 120 is transmitted as a negative spike through capacitor C4 to the collector 122 of transistor Q8. The spike is transmitted through capacitor C2 to the base 124 of transistor Q7 turning transistor Q7 from a normally on condition to a cutoff condition. With transistor Q7 at cutoff current immediately flows from the positive terminal 74 of the power supply not shown through resistors R30 and R29 to the base 130 of transistor Q6 switching transistor Q6 from a normally nonconducting state to a conducting state. Collector 132 of transistor Q6 is connected across charging capacitor C17 of oscillator O. Once transistor Q6 conducts, charging capacitor C17 is clamped to ground terminating further oscillation. As soon as the oscillation ceases, motor rotation is halted preventing further movement of torch T and wiper arm R. Transistor Q7 of Dwell control A remains cutoff for a period of time determined by the setting of wiper arm 125 of dwell potentiometer R32 in combination with capacitor C2. After this period of time elapses transistor Q7 reverts to its conducting state which in turn switches transistor Q6 back to its nonconducting state reestablishing oscillation in oscillator O. Thus, dwell control A suspends torch movement at the outer extremity of torch travel in one longitudinal direction for a controlled period of time. Dwell control B operates in the same manner as dwell control A but on alternate half cycles. Hence, dwell control B suspends torch movement at the extreme end of torch travel in the opposite direction. The period of torch suspension for dwell control B is determined by the setting of wiper arm 95 of variable potentiometer R41 in combination with capacitor C6.

The range of dwell periods can be altered by closing switch S1 in dwell control A and switch S2 in dwell control B. By closing switch S1, capacitor C3 is placed in parallel with capacitor C1. In the same way, by closing switch S2, capacitor C7 is placed in parallel with capacitor C6.

Where welding conditions are known in advance, the system may be preprogrammed. The variable controls may be replaced by plug in boards containing fixed resistors. An operator need only exchange resistor boards for different welding conditions.

What I claim is:

1. An electronic welding torch oscillator control system comprising:
   a. a motor for driving a torch;
   b. means connected between said motor and said torch for reciprocating said torch along a rectilinear path in response to the direction of rotation of said motor;
   c. a bridge circuit having a first and second arm connected in parallel to a source of DC potential, said first arm having a predetermined impedance and providing a first DC output signal of predetermined amplitude and polarity, said second arm having a predetermined impedance and providing a second DC output signal of predetermined amplitude and polarity;
   d. means coupled to said first arm for varying the impedance thereof in response to the movement of said torch thereby varying said first DC output signal;
   e. a difference amplifier for comparing said first and second DC output signals and an output lead for providing a third output signal representing the difference between said compared first and second output signals;
   f. means coupled to said second arm and to said third output signal for reversing the polarity of said second DC output signal when the magnitude of said third output signal is essentially zero; and
   g. means responsive to the polarity of said third output signal for rotating said motor in a direction dependent upon the sense of such polarity.

2. An electronic welding torch oscillator control system as defined in claim 1 wherein said motor is a stepping motor.

3. An electronic welding torch oscillator control system as defined in claim 2 wherein said means for rotating said stepping motor comprises:
   a. means for generating a continuous series of unidirectional drive pulses;
   b. first gate means responsive to one polarity of said third output signal for directing said drive pulses to said motor for rotating said motor in a clockwise direction; and
   c. second gate means responsive to the opposite polarity of said third output signal for directing said drive pulses to said motor for rotating said motor in a counterclockwise direction.

4. An electronic welding torch oscillator control system as defined in claim 3 further comprising; first delay means coupled between said output lead of said differential amplifier and said drive pulse generator means for inactivating said pulse generation means for a first predetermined period of time in response to a positive to negative reversal in the output polarity of said third output signal, and second delay means coupled between said output lead of said differential amplifier and said drive pulse generator means for inactivating said pulse generator means for a second predetermined period of time in response to a negative to positive reversal in the output polarity of said third output signal.

5. An electronic welding torch oscillator control system as defined in claim 4 wherein said means coupled to said first arm for varying the impedance thereof is a variable potential having a wiper arm mechanically coupled to said motor.

6. An electronic welding torch oscillator control system as defined in claim 5 wherein said second arm of said bridge circuit includes a variable potentiometer and a switching transistor and wherein the switching mode of said switching transistor is reversed when the magnitude of said third output signal is essentially zero.

7. An electronic welding torch oscillator control system as defined in claim 5 wherein said drive pulse generator means is a relaxation type oscillator which includes a speed adjustment control for varying the number of pulses produced per unit time.

8. An electronic welding torch oscillator control system as defined by claim 3 wherein said output lead of said differential amplifier is connected to a linear amplifier for providing a constant amplifier output signal in response to a predetermined magnitude of said third output signal and wherein said first and second gate means are AND gates which receive said constant amplitude output as one input thereto and which receive said drive pulses as a second input thereto.